US007680884B2

(12) United States Patent
Zhou et al.

(10) Patent No.: US 7,680,884 B2
(45) Date of Patent: Mar. 16, 2010

(54) SYSTEM AND IMPLEMENTATION METHOD OF CONTROLLED MULTICAST

(75) Inventors: Peng Zhou, Shenzhen (CN); Yue Liu, Shenzhen (CN); Kai Zhong, Shenzhen (CN); Guangxian Yang, Shenzhen (CN); Kebin Liu, Shenzhen (CN); Kuncheng Peng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1345 days.

(21) Appl. No.: 10/502,543

(22) PCT Filed: Aug. 28, 2002

(86) PCT No.: PCT/CN02/00596

§ 371 (c)(1),
(2), (4) Date: Jul. 27, 2004

(87) PCT Pub. No.: WO03/065677

PCT Pub. Date: Aug. 7, 2003

(65) Prior Publication Data

US 2005/0091313 A1    Apr. 28, 2005

(30) Foreign Application Priority Data

Jan. 30, 2002  (CN) .................... 02 1 00445

(51) Int. Cl.
*G06F 15/16* (2006.01)
(52) U.S. Cl. ............... 709/205; 709/223; 370/395.53; 370/395.31
(58) Field of Classification Search ............. 709/205, 709/223–229, 238; 370/395.2, 395.31, 395.53, 370/398–410; 713/170
See application file for complete search history.

(56) References Cited

U.S. PATENT DOCUMENTS 5,684,800 A * 11/1997 Dobbins et al. ............ 370/401
(Continued)

FOREIGN PATENT DOCUMENTS

| EP | 0 887 982 | 12/1998 |
| EP | 0924900 A | 6/1999 |
| WO | 00/62480 | 10/2000 |

OTHER PUBLICATIONS

Fenner W: "RFC 2236: Internet Group Management Protocol, Version 2" IETF Standard-Working-Draft, Internet Engineering Task Force, IETF, CH, Nov. 30, 1997, XP002230720 sections 3 and 6.

(Continued)

*Primary Examiner*—Yemane Mesfin
*Assistant Examiner*—Greg Bengzon
(74) *Attorney, Agent, or Firm*—Slater & Matsil, L.L.P.

(57) ABSTRACT

A system and method for implementing controlled multicast, wherein comprises Ethernet switch 1, multicast router 2, as well as portal server 3 and AAA server 4 that connect with the multicast router, where Ethernet switch 1 connects with each hosts of user in a downlink, in an uplink connects with multicast router 5 and implements multicast switch of layer 2; portal server 3 is used as an interface for access authentication of the user, AAA server 4 is used to store configuration of user privilege for joining in a multicast group; multicast router 2 connects with multicast router 5 of other systems in the uplink, and cooperates together with AAA server 4 to completes privilege authentication for the user when he joins in the multicast group, distributes a control command according to results of the authentication, and controls forwarding of the multicast made by Ethernet switch 1. The method according to the present invention can resolve better the authenticated authorization and controlled problem of the sender and receiver joining in the multicast, and can identify the host joining in or leaving the multicast group expediently, actively stop the user's group member identification through offline without any influence on the forwarding efficiency.

15 Claims, 6 Drawing Sheets

U.S. PATENT DOCUMENTS

| | | | | |
|---|---|---|---|---|
| 5,968,126 A | * | 10/1999 | Ekstrom et al. | 709/225 |
| 6,269,404 B1 | * | 7/2001 | Hart et al. | 709/238 |
| 6,275,859 B1 | | 8/2001 | Wesley et al. | 709/229 |
| 6,307,837 B1 | * | 10/2001 | Ichikawa et al. | 370/230 |
| 6,331,983 B1 | * | 12/2001 | Haggerty et al. | 370/400 |
| 6,839,348 B2 | * | 1/2005 | Tang et al. | 370/390 |
| 6,870,842 B1 | * | 3/2005 | Caronni et al. | 370/390 |
| 7,263,610 B2 | * | 8/2007 | Parker et al. | 713/163 |
| 2002/0091926 A1 | * | 7/2002 | Fukutomi | 713/170 |
| 2002/0138575 A1 | * | 9/2002 | Hirata | 709/205 |
| 2007/0121565 A1 | * | 5/2007 | Halasz et al. | 370/338 |

OTHER PUBLICATIONS

Yamanouchi N et al.: "Radius Extension for Multicast Router Authentication; draft-yamanouchi-radius-ext-00.txt;"IETF Standard-Working-Draft, Internet Engineering Task Force, IETF, CH, Mar. 12, 1998, XP015037077 ISSN: 0000-0004 sections 2 and A.2-A.4.

* cited by examiner

| Ver. | Type | Reserved | Count |
|------|------|----------|-------|
| GDA ||||
| GDA || USA ||
| USA ||||

SYSTEM AND IMPLEMENTATION METHOD OF CONTROLLED MULTICAST

FIELD OF THE TECHNOLOGY

The present invention relates generally to an IP multicast technique, and more particularly, to an IP controlled multicast system and thereof implementation method in a telecommunication technological field.

BACKGROUND OF THE INVENTION

Along with maturation of the IP multicast technique, application of the IP multicast is becoming increasingly widespread. However, in an P model, any host can join into any of the multicast groups without limitation, and until now, there are no effective methods that can solve the controlled join problem of a host in an IP multicast network.

It is well known that, in the IP multicast model, a multicast group comprises senders and receivers, which are connected with a multicast Distribution Tree. When the sender needs to send data to a certain group, the host will transmit the data directly to the multicast router which connects with the host, and the multicast router then forwards the data to the multicast receiver via the multicast Distribution Tree without any limitation on the host that sends messages. As soon as a host wants to get data from a certain multicast group, the host sends a Member report message to its connected multicast router according to an Internet Group Management Protocol (IGMP for short), and the multicast router will then forward the data of the multicast group to the host after the Member report message is processed; similarly, the multicast router will not make any limitations on the host which wants to obtain the multicast message. With the development of commercialization in IP multicast application, multicast security has become an urgent problem that should be solved as soon as possible, a key of which is prohibiting unauthorized receivers to receive the multicast messages.

Norihiro Ishikawa et al proposed an IGMP extension protocol "IGMP Extension for Authentication of IP Multicast" (published at draft-ietf-idmr-igmp-auth-01.txt) and a RADIUS extension protocol. "RADIUS Extension for Multicast Router Authentication", (where, the RADIUS is abbreviation of Remote Authentication Dial In User Service, which is published at draft-yamanouchi-RADIUS-ext-00.txt), with which authentication for the sender and the receiver can be made.

The IGMP extension protocol above is extension made based on an IGMP V2 (version 2), in which authentication function for the multicast sender and the multicast receiver is added, to prevent unauthorized users from sending/receiving multicast packets. The IGMP extension protocol adopts a Challenge-Response mechanism that is similar with a PPP authentication protocol CHAP (Challenge Handshake Authentication Protocol) such as thrice handshakes, encrypted password to make user authentication. Once a multicast sender begins to transmit IP multicast messages, an Ingress router may make authentication for it with the challenge-response mechanism. The Ingress router may utilize a RADIUS as an authentication server during the authentication process. When the authentication is successful, the multicast packets from the sender will be forwarded by the Ingress router to the IP multicast network and then to an Egress router. When the authentication is failed, the Ingress router will discard the multicast packets silently. Authentication made by the Egress router is needed when the multicast receiver wants to receive IP multicast messages. The Egress router may also adopt the RADIUS as the authentication server during the authentication process. Once the authentication succeeds, the Egress router begins to transmit the IP multicast packets to the receiver; Otherwise, no IP packets will be forwarded to the receiver.

The RADIUS extension protocol above is extension made in the basis of the RADIUS, which may make authentication for the multicast sender and the multicast receiver at the Ingress router and the Egress router, and track multicast data of the user to provide data for service management. The authentication server must be able to provide the authentication service required by the multicast router, meanwhile, the multicast router might provide identification (User ID) and password of the user. In order to insure security, authentication process must be based on the challenge, and every service must be authenticated, for instance, authentication must be made on the address of each multicast group. The reason is that multicast packets are transmitted according to the group address, and the authority of the user should be correlative with the group. Except for some additional attributes, other requirements are just the same with that of the RADIUS. Whether or not the multicast router makes RADIUS authentication is optional.

When being configured to support RADIUS charging, the multicast router will generate a charging start message at the beginning of the multicast service, and send to a RADIUS multicast charging server, wherein the message describes type of the service. After receiving the charging start message, the RADIUS multicast charging server will return a confirmation message. When the multicast service is completed, the multicast router also generates a charging end message, and sends the message to the RADIUS multicast charging server. After receiving the message, the RADIUS multicast charging server will also return a confirmation message, wherein the charging end message describes type of the service.

After receiving an IGMP Join request, the multicast router sends an Access-Request message to a RADIUS multicast authentication server to ask for authentication. After receiving a response from the RADIUS multicast authentication server that indicates the authentication is successful, the multicast router sends an Account-Request/Start message to the RADIUS multicast charging server to start charging. While receiving an IGMP Leave request, the multicast router may send an Account-Request/Stop message to the multicast charging server to terminate the charging. If no response is returned to the multicast router within certain period of time, the RADIUS extension protocol advices the multicast router to resend the Access-Request message several times continuously. The multicast charging server can also ask other servers (such as a proxy sever) to implement the charging function. While being unable to record charging message successfully, the multicast charging server cannot send an Accounting-Response confirmation message to the multicast router.

Figure 1:
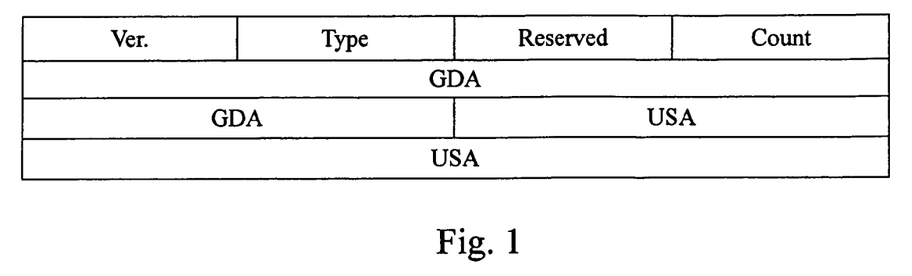
FIG. 1 is a schematic diagram of the controlling message format in the prior art.

Moreover, a mean of a forwarding table of a layer 2 equipment controlled by a layer 3 equipment, which can control authorized reception in a certain extent, has been provided. As shown in FIG. 1, controlling message used for controlling the forwarding table of a layer 2 equipment is composed by number of edition (Ver, 4 bits), Type (3 bits), Reserved part (2 bytes), number of GDA/USA pairs in the message (Count, 1 byte) and several GDA/USA pairs. Wherein, the GDA (Group Destination Address) is a MAC multicast address that corresponds to an IP address of the multicast group that the host wants to join in; the USA (Unicast Source Address) is a MAC address of the host which wants to join in the multi cast group and is a unicast address.

Figure 2:
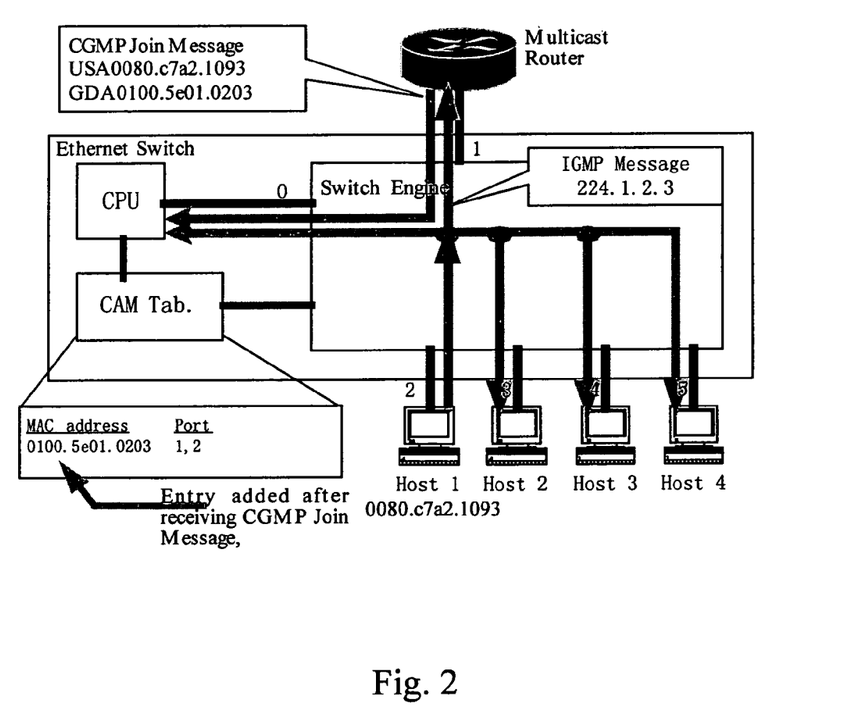
FIG. 2 is a schematic diagram illustrating flow direction of the signal that host 1 first joins in multicast group 224.1.2.3 in process of the mean of a forwarding table of a layer 2 equipment controlled by a layer 3 equipment in the prior art.

As shown in FIG. 2, process of the mean of forwarding table of a layer 2 equipment controlled by a layer 3 equipment is as follows. Host 1 sends an IGMP Membership Report message to join in multicast group 224.1.2.3; the switch uses MAC address 0100.5e01.0203 that corresponds to the address of multicast group resoluted from the message to search its matching terms in a CAM (CAM: Content-Addressable Memory) table; because there is no its matching terms in the CAM table, the message is forwarded (flooding) to all the ports, including a CPU and multicast routers. Wherein, after receiving the IGMP Membership Report message, the multicast router, besides implementing routine disposal, produces a join message and multicasts to the switch, which comprises the MAC address (USA: 0080.c7a2.1093) of the host which applies to join in the multicast group, the MAC address (GDA: 0100.5e01.0203) of the multicast group which is applied to join in, as well as a Join command field. After receiving the Join message, the switch may add an entry in the CAM table, which includes the GDA (0100.5e01.0203 in the drawings), the port number (marked as 2 in the drawings) of the host which wants to join in the multicast group, and the port number (marked as 1 in the drawings) of the multicast router that connects with the switch. Wherein, the port number of the host is obtained through searching the USA.

Figure 3:
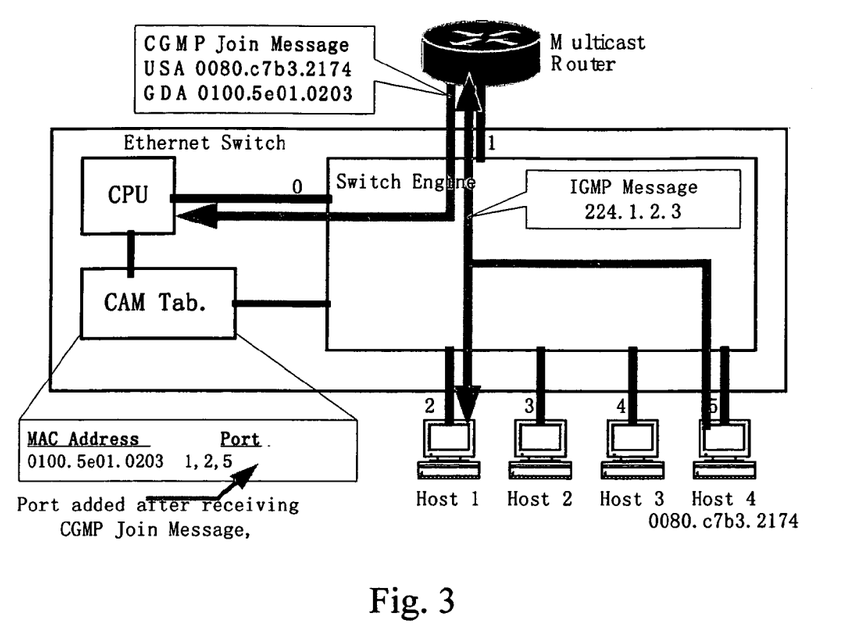
FIG. 3 is a schematic diagram illustrating flow direction of the signal that host 4 second joins in multicast group 224.1.2.3 in process of the mean of a forwarding table of a layer 2 equipment controlled by a layer 3 equipment in the prior art.

As shown in FIG. 3, when the fourth host 4 joins in multicast group 224.1.2.3, it will similarly send the IGMP Membership Report message to the switch; after having resoluted the IP address of the destination group is 224.1.2.3, the switch may find the entry after searching in the CAM table with the corresponding MAC address 0100.5e01.0203 of the IP address, and forward the message to port 1 and 2 (which are the multicast router and host 1 respectively) listed in the entry. After receiving the IGMP Membership Report message, besides making routine disposal, the multicast router produces a Join message and multicasts to the switch, which comprises the MAC address of the host which applies to join in the multicast group (USA: 0800.c7b3.2174) and the MAC address (GDA: 0100.5e01.0203) of the multicast group which is applied to join in, as well as the Join command field. After receiving the Join message, the switch may obtain an entry through searching in the CAM table with GDA, and get port number 5 of host 4 via searching in the CAM table with USA, meanwhile add port number 5 in the entry.

Although the Synergic extension method between the IGMP and the RADIUS above has solved the authorization problems for the sender and the receiver, some shortcomings still exist.

(1) Once a host join in the multicast group successfully in a shared network, all the other hosts will be able to receive the multicast data, which means, it is impossible to prevent the unauthorized hosts from receiving the multicast data. If a key method is adopted to solve the problem, distribution of keys before authentication for each host will bring numerous limitations and troubles.

(2) If both these two protocols are adopted, it is necessary not only to renew the multicast router equipment, but also to modify IGMP software in the host side. Furthermore, none of these two protocols is standardized; the present hosts don't support the IGMP extension.

Defects of the mean of a forwarding table of a layer 2 equipment controlled by a layer 3 equipment can be notices as follows.

(1) No relation between forwarding control on the layer 2 switch controlled by the multicast router and authorized reception of the host/user is provided, and no authenticating and authorizing method for the user to join in the multicast group is provided either, all the control methods provided are a control method for the multicast message of the layer 2 switch flooding at its port.

(2) The multicast router cannot detect "Silent Leave" of the host/user.

SUMMARY OF THE INVENTION

It is an object to provide a controled multicast system, in order to provide application environment for a controlled multicast method of the invention.

It is another object to provide the method for implementing controlled multicast, in order to solve multicast disadvantages of the prior arts, which include synergic method between the IGMP extension and the RADIUS extension, and the mean of a forwarding table of a layer 2 equipment controlled by a layer 3 equipment; at the same time, the method can preferably solve problems of authorization authentication and controlled join of the sender and receiver which participate in the multicast.

A controlled multicast system, including an Ethernet switch and a multicast router, wherein, the Ethernet switch connects with each host of a user in a downlink, connects with the multicast router in a uplink, the multicast router connects with a multicast router of other systems in the uplink, the Ethernet switch implementing multicast exchange of a layer 2, an IGMP V2 protocol is adopted as group management protocol between the Ethernet switch and the host of the user; the controlled multicast system further comprises: a portal server and an AAA server that connect with the multicast router; the portal server acting as an interface of user access authentication, the AAA server being used for storing configuration of privilege for the user to join in a multicast group; the multicast router cooperating with the AAA server together to implement privilege authentication for the user to join in the multicast group, and distributing control commands according to results of the authentication to control multicast forwarding operations of the Ethernet switch.

A RADIUS+ protocol extended from an AAA protocol is adopted as communication protocol between the multicast router and the AAA server; a group management protocol HGMP (Huawei Group Management Protocol) is used as a control protocol between the Ethernet switch and the multicast router.

A method for implementing a controlled multicast, comprises: implementing access authentication first; then an Ethernet switch classifying a vlan according to a port and handling an IGMP message from a host, implementing user identification, authentication for joining in a multicast group, and a multicast router handling the IGMP message; in succession, the multicast router controlling the Ethernet switch for multicast forwarding, between which a HGMP protocol is used as a control protocol of the controlled multicast; after that, the Ethernet switch disposing a HGMP control message and forwarding a multicast flow; the host leaving the multicast group and making corresponding processes after finishing the forwarding operation.

wherein the step of implementing access authentication comprises, (1) when accessing a network, the host inputting an authentication information that includes a User ID and a password first through an interface provided by a portal server, and a AAA server authenticating identification of the host with the information; once the authentication is successful, the multicast router recording the User ID and a corresponding vlan ID of the host in a multicast access privilege table of the user;

the step of the Ethernet switch classifying the vlan according to the port and handling the IGMP message from the host comprises, (2) classifying the vlan according to the ports, with one vlan for each port, and linking one port to one host; searching a Content-Addressable Memory (CAM) table with a destination MAC address of the IGMP message sent by the host and forwarding the said IGMP message, of which forwarding process is same with that of a unicast message: if the port corresponding to the destination MAC address is found, forwarding the multicast message to the port, otherwise forwarding the multicast message to all the ports;

the step of implementing user identification, authentication for joining in the multicast group, and handling the IGMP message by the multicast router comprises, (3) after receiving an IGMP Membership Report message, according to the vlan ID in the message, the multicast router finding the corresponding User ID and the host to which the IGMP Membership Report message belongs through searching in the multicast access privilege table of the user recorded in step (1), and then sending an extended RADIUS authentication message which includes the User ID just found as the user name and the address of multicast group in which the host wants to join as an attribute, to the AAA server for authentication;

the AAA server determining whether to accept the user based on services of the user; if the user has the suitable privilege, responding with an acceptance message, otherwise returning a reject message; after receiving the reject message, the multicast router do nothing, but if receiving the acceptance message, the multicast router writing the address of the multicast group in which the user can join into the multicast access privilege table of the user, and implementing a routine disposal on join messages of the host, then generating and transmitting a HGMP Join message to the Ethernet switch, which comprises the vlan ID corresponding to the port that links with the host which wants to join in the multicast group, the address of the multicast group that is applied for, and a Join command field; moreover, the multicast router also completing a routine processing of creating multicast forwarding tree on the IGMP Membership Report message just like an ordinary multicast router does;

the step of the multicast router controlling the Ethernet switch making the multicast forwarding with the HGMP protocol being control protocol of the controlled multicast comprises, (4) managing generation and deletion of an entry in the CAM table at the Ethernet switch by the multicast router; while allowing the host to join in the multicast group, the multicast router sending the HGMP Join message that includes the vlan ID of the host which applies to join in the multicast group and the address of the multicast group applied for to the Ethernet switch; when the multicast router wants to terminate the host joining in the multicast group, the multicast router transmitting a HGMP Leave message which comprises the vlan ID of the host which leaves the multicast group and the address of the multicast group where the host leaves;

the step of the Ethernet switch disposing the HGMP control message comprises, (5) after receiving the HGMP Join message, the Ethernet switch searching the CAM table with the MAC address corresponding to the address of the multicast group; if the entry corresponding with the address is found, the Ethernet switch obtaining the port number of the host via the vlan ID in the HGMP Join message, and then adding the port number into the said entry; if nothing is found, adding an entry in the CAM table, which comprises the MAC address corresponding to the multicast address, the port number of the host which applies to join in the multicast group, and the port number of the multicast router connected with the Ethernet switch;

after receiving the HGMP Leave message, the Ethernet switch obtaining the entry through looking up the CAM table with the MAC address corresponding to the multicast address of the multicast group, and getting the port number of the host through the vlan ID, and then deleting the said port number from the said entry, if the said port number is the solely port of the said entry, deleting the whole entry;

the step of forwarding of the multicast flow comprises, (6) when receiving the multicast flow sent from the multicast source, the multicast router forwarding the multicast flow to an egress based on a CAM table; when handling the IGMP Membership Report message of the host, the multicast router creating a multicast forwarding egress according to the real port of the Ethernet switch, and sending only one copy of the multicast flow to the Ethernet switch;

the step of the host leaving the multicast group comprises, (7) after finishing the multicast and wanting to leave the multicast group, the host sending an IGMP Leave message; after receiving the IGMP Leave message, the multicast router extracting the vlan ID from the message, and obtaining corresponding entry via searching in the multicast access privilege table created in step (1) with the vlan ID, then deleting the address of the multicast group indicated by the IGMP Leave message in the entry; after completing a routine disposal on leave messages, the multicast router generating the HGMP Leave message and sending to the Ethernet switch, which includes the vlan ID of the host which wants to leave group, the address of multicast group where the host wants to leave and a Leave command field.

wherein the CAM table and the unicast forwarding table of the Ethernet switch are shared.

wherein, during the messages forwarding, adopting a vlan protocol between the port of the multicast router and the Ethernet switch.

in step (6) there is no vlan ID in a multicast data packet of the multicast flow sent from the multicast router.

in step (7) of leaving from the multicast group can also be implemented via following means which comprises, once the multicast router knows offline status of the user, the multicast router actively sending the HGMP Leave message to terminate multicast flow transmission to the host, which is same with that of processing on the IGMP Leave message.

The method further comprises controlling the multicast sender, which includes when the host transmits data to the multicast group, the first receiver among the multicast routers filtering the data message with a multicast Access Control List (ACL), and forwarding the data message that satisfies the requirements in the ACL to the multicast tree.

wherein the multicast ACL comprises a command word, a source address and a group address.

wherein the multicast ACL is distributed to each multicast router by a centralized multicast service control server; the step of controlling the sender is accomplished with the multicast ACL by the multicast router, meanwhile the multicast service control server is also acts as the AAA server.

wherein the multicast ACL can also be distributed by a centralized policy server or a network manager.

The main advantages of the present invention are as following. The method provides an effective technical means for authenticated authorization when the user join in the multicast group, in order to ensure that only the authorized user can join in the multicast group; through one-to-one relationship among the port, the user and the vlan ID, together with access authentication for the user, the user who joins in or leaves the multicast group can be easily identified. The multicast router can make the active and decisive control on the multicast forwarding function of the layer 2 switch, and distribute its control policy to the Ethernet switch, which can preferably solve the controlled problems in the IP multicast service. Secondly, when the host leaves the multicast group without sending the IGMP Leave message, for instance, when multicast application program terminates abnormally, the group membership can be actively terminated through offline of the user. What is more, there is no influence on forwarding efficiency after introduction of the control means according to the present invention. The method in the present invention has a splendid application future.

EMBODIMENTS OF THE INVENTION

The present invention will be described in more detail hereinafter with reference to the accompanying drawings.

Figure 4:
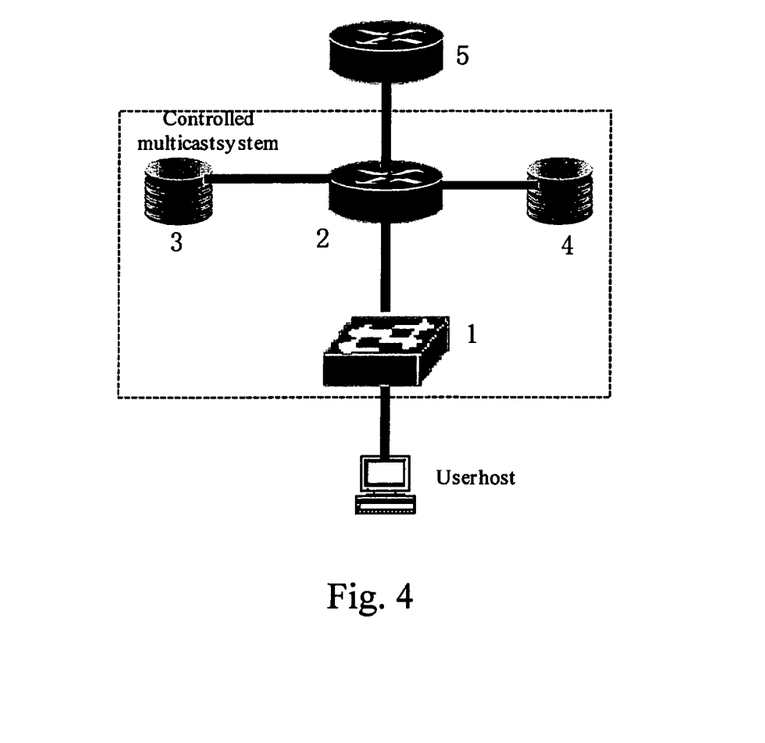
FIG. 4 is a schematic diagram illustrating the system structure of the controlled multicast system according to the present invention.

Now refer to FIG. 4. The invention provides the controlled multicast system that includes Ethernet switch 1 and multicast router 2, wherein Ethernet switch 1 connects with each hosts of the user in the downlink, and in the uplink with multicast router 2 which further connects with multicast router 5 of other systems; the IGMP V2 (version 2) protocol is used as group management protocol between the host and the Ethernet switch who implements multicast exchange of layer 2. The controlled multicast system further comprises: portal server 3 and AAA server 4 that connect with multicast router 2, wherein, portal server 3 is used as the interface of access authentication for the users, AAA server 4 is used for storing Privilege configuration of the users who want to join in the multicast group, a Client-server structure is adopted between AAA server 4 and multicast router 2, and the multicast router 2, together with AAA server 4, makes authentication for the privilege of users who want to join in the multicast group, and distributes control orders according to results of the authentication, in order to control forwarding operation of the multicast made by Ethernet switch 1. In the invention, the RADIUS+ protocol that is extended from the standard RADIUS protocol is adopted as communication protocol between multicast router 2 and AAA server 4, meanwhile, the group management protocol. HGMP is used as control protocol between Ethernet switch 1 and multicast router 2.

The implementing method and operational steps of the complete process for the host joining in the multicast group according to the present invention will be described in more detail hereinafter with reference to the accompanying drawings from FIG. 5 to FIG. 10 and an embodiment.

Figure 5:
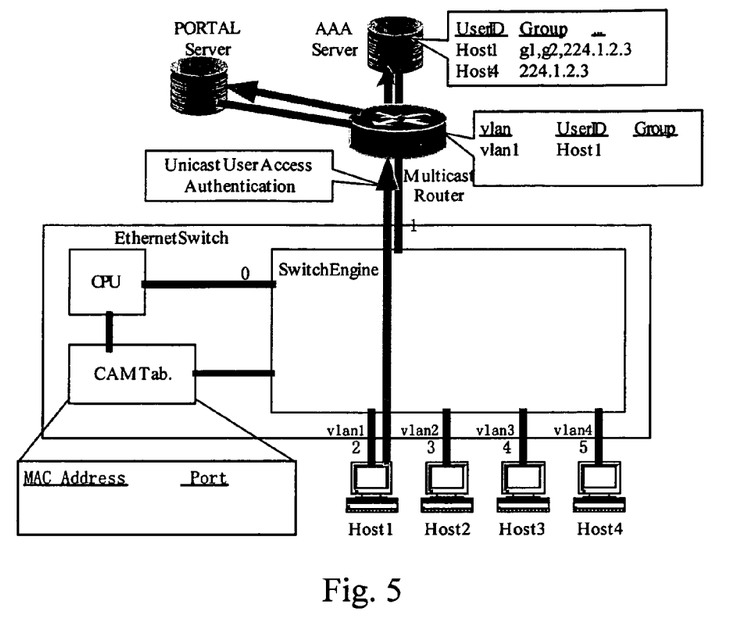
FIG. 5 is a schematic diagram illustrating flow direction of the signal while making access authentication for host 1 in the controlled multicast according to the present invention.

As shown in FIG. 5, when a certain host (supposing host 1) wants to access the network, first the host must make authentication through the interface provided by the portal server; the AAA server is an authentication server. The User ID in the pane at right side of the AAA server in the drawing represents the user name input by the user while making authentication, and group represents address of the multicast group in which the user wants to join. The Ethernet switch (LAN Switch) classifies the vlan according to the ports, each of which connects with one user. Wherein port 1 links the multicast router, and the ports from 2 to 5 connect each host from 1 to 4 respectively. Once the authentication is successful, the multicast router will record the User ID of host 1 (i.e. host 1) and the corresponding vlan number (i.e. vlan 1) of host 1 (here, assume the user name in a user account of host 1 is host 1).

Figure 6:
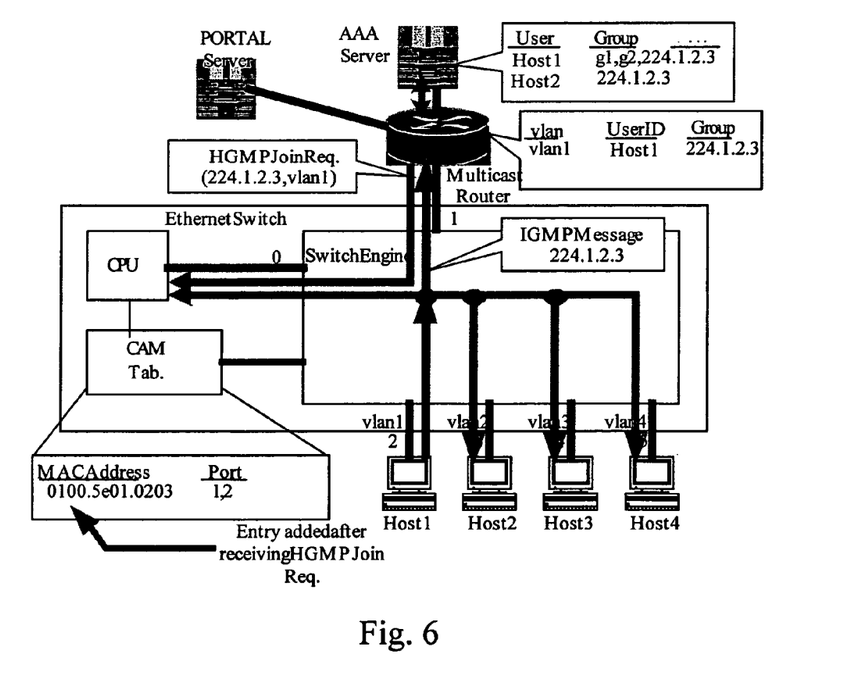
FIG. 6 is a schematic diagram illustrating flow direction of the signal that host 1 first joins in multicast group 224.1.2.3 in the controlled multicast according to the present invention.

As shown in FIG. 6, when host 1 wants to join in the multicast group (assuming the group 224.1.2.3), the host may send the IGMP Membership Report message to join in multicast group 224.1.2.3; the Switching Engine searches in the CAM table with the destination MAC address 0100.5e01.0203 in the message; because there is no matching terms in the CAM table, the message is forwarded (flooding) to all the ports, including the CPU and the multicast router; wherein, according to receiving ports, the message that is forwarded to the multicast router will be attached with the vlan number (in case of host 1, it is vlan1).

After receiving the IGMP Membership Report message, the multicast router extracts the vlan ID (vlan 1) from the message, with which obtaining the User ID (host 1) corresponding to the user; the multicast router appoints the found User ID as the user name, making the address (224.1.2.3) of multicast group in which the host wants to join as its attribute, sending the extended RADIUS authentication message to the AAA server for authentication; the AAA server determines whether to accept the user according to the service that he applied for. If the user has a certain privilege, the multicast router may response with the acceptance message, otherwise send the reject message as response. In case of receiving the reject message, the multicast router will do nothing; once the received message is the acceptance message, the multicast router will record the address of the multicast group where the user can join into the multicast access privilege table of the user, and make the routine process of the multicast router on the message, then generate and transmit the HGMP Join message to the switch, which comprises the vlan number (vlan 1) of the host which applies to join in the multicast group, the address (224.1.2.3) of the multicast group in which the host applies to join, and the Join command field.

After receiving the HGMP Join message, the switch will add an entry in the CAM table, which comprises the MAC address (0100.5e01.0203) that is corresponding to the multicast address (224.1.2.3), port number (2) of the host which applies to join in the multicast group and port number (1) of the multicast router that connects with the switch. Wherein, the port number of the host is obtained through searching in a table with the vlan ID.

Figure 7:
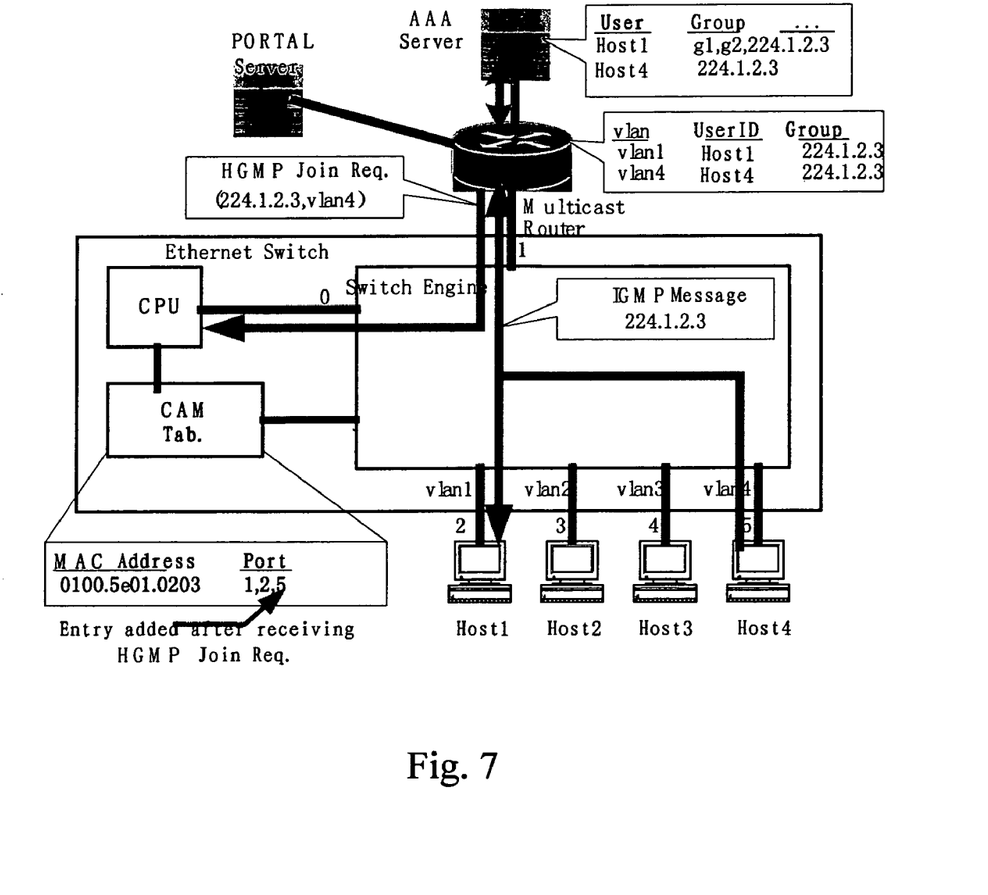
FIG. 7 is a schematic diagram illustrating flow direction of the signal that host 4 second joins in multicast group 224.1.2.3 in the controlled multicast according to the present invention.

Now refer to FIG. 7. When other new host (assume the fourth host 4) joins multicast group 224.1.2.3 (assume the host has already passed the access authentication in the same way with that of host 1 in the first step), and also sends the IGMP Membership Report message to the switch, the Switching Engine finds the entry via searching in the CAM table with the destination MAC address 0100.5e01.0203, and then sends the message to port 1 and 2 (i.e. the multicast router and host 1) listed in the entry.

After receiving the IGMP Membership Report message, the multicast router extracts the vlan ID (vlan 4) from the message, with which the multicast router finds the User ID (host 4) corresponding to the user through searching in the multicast access privilege table, and then appointing the User ID as the user name, the address (224.1.2.3) of the multicast group where the host wants to join as its attribute, finally transmits the extended RADIUS authentication message to the AAA server for authentication; the AAA server will determine whether to accept the user according to the service he applied for. If the user has a certain privilege, the multicast router may response with the acceptance message, otherwise send the reject message as response. In case of receiving the reject message, the multicast router will do nothing; once the received message is the acceptance message, the multicast router will write the address of the multicast group in which the user can join into the multicast access privilege table of the user, and make routine process of the multicast router on the join message of the host, then generate and transmit the HGMP Join message to the switch, which includes the vlan number (vlan 4) of the host which applies to join in the multicast group, the address (224.1.2.3) of the multicast group in which the host applies to join, and the Join command field.

After receiving the HGMP Join message, the switch will search in the CAM table with the MAC address (0100.5e01.0203) that corresponding to the address (224.1.2.3) of the multicast group; because there exits the entry in the CAM table after host 1 have joined the group 224.1.2.3 in the above step as shown in FIG. 6, the same entry that is identical with the result of last search will be obtained; the port number of the host (5) will be added in the entry after the port number 5 is obtained through searching in the CAM table with the vlan ID.

Figure 8:
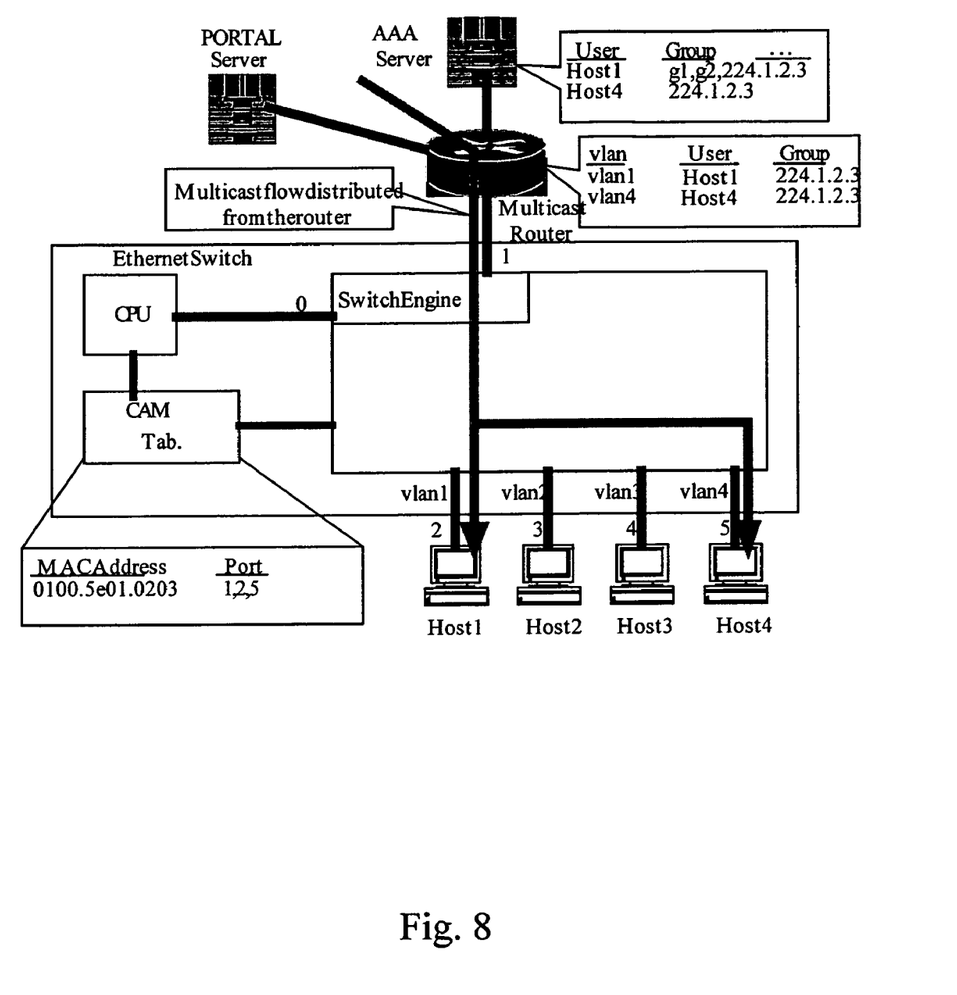
FIG. 8 is a schematic diagram illustrating flow direction of the signal with which the multicast router forwards the multicast flow in the controlled multicast according to the present invention.

As shown in FIG. 8, when the multicast router receives the multicast flow sent from the multicast source, the multicast flow will be forwarded to the egress according to the CAM table. Because the multicast router creates the multicast forwarding egress based on the real ports of the switch rather than the vlan number when handling the IGMP Membership Report message of the host, the switch connected with the multicast router has only one egress in the CAM table, and only one copy of the multicast flow is transmitted to the switch, without the vlan ID in the multicast data packet.

Figure 9:
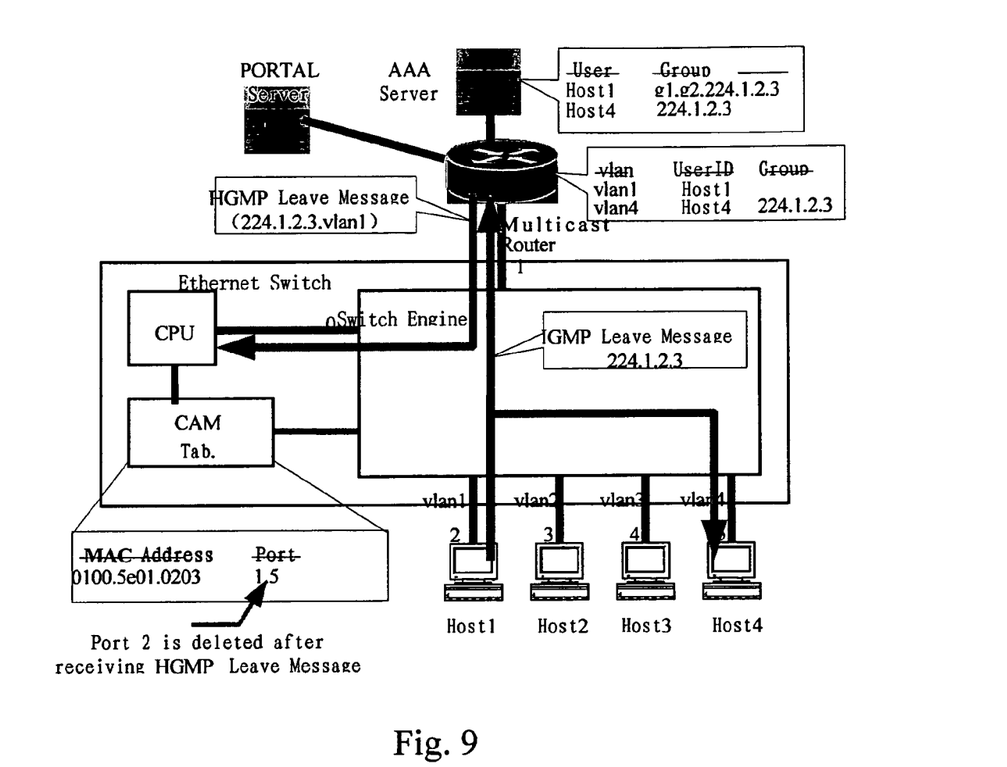
FIG. 9 is a schematic diagram illustrating flow direction of the signal that indicates host 1 leaves multicast group 224.1.2.3 in the controlled multicast according to the present invention.

As shown in FIG. 9, once wanting to leave multicast group 224.1.2.3, host 1 may send the IGMP Leave message to the switch; in the FIG. 9, what corresponds to the IGMP Leave message sent by host 1 is the arrow drawn from host 1, and the Switching Engine searches in the CAM table with destination MAC address 0100.5e01.0203; after finding the entry, the Switching Engine will transmit the message to the ports listed in the entry: 1 and 5 (i.e. the multicast router and host 4).

After receiving the IGMP Leave message of the member, the multicast router extracts the vlan ID (vlan 1) from the message, and obtains the corresponding entry through searching in the multicast access privilege table with the vlan ID, then delets multicast address 224.1.2.3 indicated by the IGMP Leave message in the entry as shown in FIG. 9; i.e. after deleting address 224.1.2.3 in the multicast group column (group) in the pane at right side of the multicast router, where the user who corresponds to vlan 1 has right to join in, the multicast router completes the routine disposals on the leave message of the member; then generates and sends the HGMP Leave message to the switch; in the FIG. 9, what corresponds to the HGMP Leave message is the downwards arrow drawn from the multicast router, the message comprises the vlan number of the host (vlan 1) which wants to leave the multicast group and the multicast address (224.1.2.3) that will be departed as well as the Leave command field.

After receiving the HGMP Leave message, the switch may obtain the entry through searching in the CAM table with MAC address 0100.5e01.0203 that corresponds to multicast address 224.1.2.3, and get port number 2 of the host which sends the IGMP Leave message through searching with the vlan ID, and delete the port number 2 from the entry.

Figure 10:
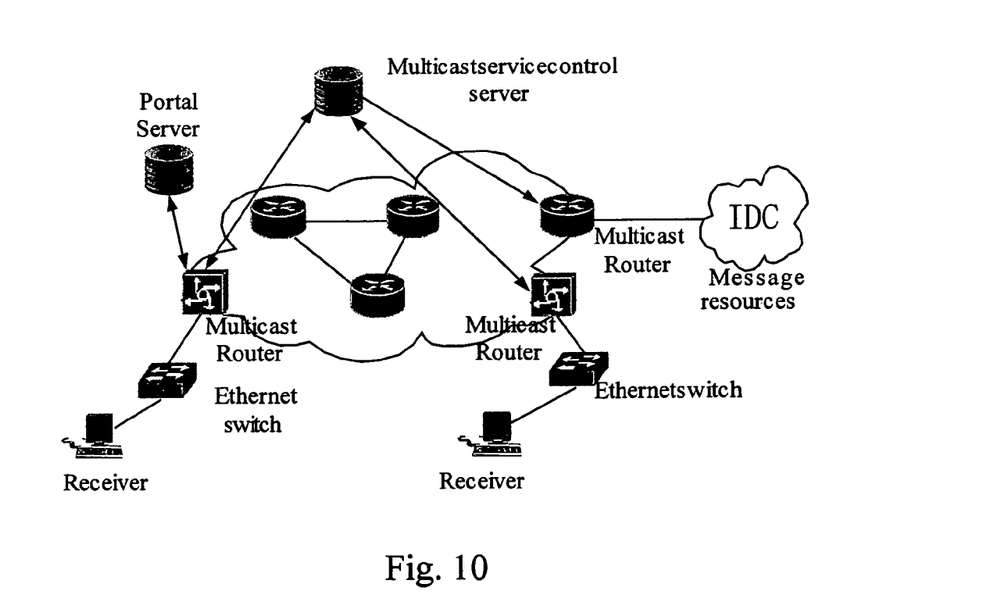
FIG. 10 is a schematic diagram illustrating the centralized control scheme in the controlled multicast system according to the present invention.

The steps above describe the detailed control processes on the multicast members of the controlled multicast method according to the present invention, moreover, the above method also comprises relevant control on the multicast sender as shown in FIG. 10. When the host (which is message resources (IDC) in FIG. 10) transmits data to a certain multicast group, the multicast router which receives the data in first place will download the multicast ACL (Access Control List, ACL for short) first via the multicast service control server, and filter the data message with the multicast ACL, only the messages that satisfy the requirements can be forwarded to the Multicast Tree. Wherein, the multicast ACL is composed of the command word, the source address and the group address which is a destination address either. In order to avoid disadvantages caused by the discrete configuration, the centralized multicast service control server is usually adopted to distribute the multicast ACL to each multicast router which further controls the functions of senders; at same time, the multicast service control server also acts as the AAA server, of course, the multicast ACL can also be distributed by the centralized policy server or the network manager.

The above system and method for implementing controlled multicast have been experimented in several apparatus designed by the applicant, the results are very successful, and the destination of control over the multicast is realized according to the present invention.

The invention claimed is:
1. A controlled multicast system, comprising:
an Ethernet switch;
a multicast router,
wherein:
the Ethernet switch connects with each of a plurality of hosts in a downlink, and connects with the multicast router in an uplink,
the multicast router connects with a multicast router of other systems in the uplink,
the Ethernet switch implementing multicast exchange of a layer 2, and an IGMP V2 protocol is adopted as group management protocol between the Ethernet switch and the host;

wherein the controlled multicast system further comprises:

a portal server, connecting with the multicast router and providing an interface of user access authentication;

an authentication sewer, storing configuration of privilege for the host which wants to join in the multicast group;

wherein:

the multicast router and the authentication server are configured to adopt a Client-sewer structure by which the authentication server authenticates identification of the host to join in a multicast group with information inputted through the interface provided by the portal sewer, and the multicast router records a User ID and a vlan ID corresponding to the User ID of the authenticated host and then distributes control commands according to results of the authentication to control multicast forwarding operations of the Ethernet switch;

configuration of privilege comprises a corresponding relation between the User ID of the host and a address of multicast group in which the host wants to join;

the information inputted through the interface provided by the portal server comprises the User ID and a password;

each port through which the host is connected to the Ethernet switch is a vlan port;

wherein the authentication sewer in the system further for, after receiving an extended RADIUS authentication message from the multicast router, of which attributes include the User ID as the user name and the address of multicast group in which the host wants to join, detecting whether to accept the host joining in the multicast group based on the configuration of privilege;

responding with an acceptance message to the multicast router if the host has suitable privilege, otherwise returning a reject message;

wherein the multicast router in the system further for, after receiving an IGMP Membership Report message from the Ethernet switch, according to the vlan ID in the message, searching the corresponding User ID in a multicast access privilege table of the multicast router, and then sending the said extended RADIUS authentication message, to the authentication server;

after receiving the acceptance message from the authentication server, writing the address of the multicast group in which the host can join into the said multicast access privilege table, and implementing a routine disposal on join messages of the host, then generating a Join message, which comprises the vlan ID corresponding to the port that links with the host which wants to join in the multicast group, the address of the multicast group that is applied for, and a Join command field, and then transmitting to the Ethernet switch moreover, completing a routine processing of creating multicast forwarding tree on the IGMP Membership Report message; doing nothing after receiving the reject message;

the Ethernet switch for, forwarding the IGMP Membership Report message from the host, wherein the IGMP Membership Report message forwarded to the multicast router port carries with the vlan ID of the host;

after receiving the Join message from the multicast router, searching the MAC address corresponding to the address of the multicast group in the forwarding table; if the entry corresponding with the MAC address is found, obtaining the port number of the host via searching in the forwarding table with the vlan ID in the Join message, and then adding the port number into the said entry; if nothing is found, adding an entry in the forwarding table, which comprises the MAC address corresponding to the multicast address, the port number of the host which applies to join in the multicast group, and the port number of the multicast router connected with the Ethernet switch;

after receiving a multicast flow from the multicast router, forwarding it to ports of the Ethernet switch with the current forwarding table.

2. The controlled multicast system according to claim 1, wherein a RADIUS+ protocol extended from a RADIUS (Remote Authentication Dial In User Service) protocol is adopted as communication protocol between the multicast router and the authentication server.

3. The controlled multicast system according to claim 1, wherein the authentication server is an AAA (Authorization And Authentication) server.

4. The controlled multicast system according to claim 1, wherein:

the multicast router in the system is further configured for:

after receiving an IGMP Leave message:

extracting the vlan ID from the message, and obtaining corresponding entry in the multicast access privilege table via searching with the vlan ID, then deleting the address of the multicast group indicated by the IGMP Leave message in the entry;

after completing a routine disposal on leave messages of the host, generating a Leave message and sending to the Ethernet switch, which includes the vlan ID of the host which wants to leave the multicast group, the address of multicast group where the host wants to leave and a Leave command field; and the Ethernet switch further configured for:

after receiving the Leave message from the multicast router, obtaining the entry through looking up the forwarding table with the MAC address corresponding to the multicast address of the multicast group, and getting the port number of the host with the vlan ID in the Leave message, and then deleting the said port number from the said entry.

5. The controlled multicast system according to claim 1, wherein the multicast router in the system is further configured for:

after knowing offline status of the host, actively generating the Leave message and sending to the Ethernet switch; and terminating the multicast flow transmission.

6. A method for implementing a controlled multicast, comprising:

A. in advance, according to ports of an Ethernet switch, classifying vlan with one vlan for each port, and linking one port to one host;

making access authentication for a host which wants to join in a multicast group, if the authentication is successful, executing step B, otherwise ending;

B. forwarding an IGMP Membership Report message from the host by the Ethernet switch;

C. detecting whether to accept the host joining in the multicast group, if it is, generating a Join message to control establishing of an entry in a forwarding table of the Ethernet switch by a multicast router, and forwarding a multicast flow from the multicast router according to the current forwarding table by the Ethernet switch; otherwise ending; wherein step A, the said step of making access authentication for a host which wants to join in the multicast group comprises, in advance, storing configuration of privilege for hosts which want to join in the multicast group in an authentication server that connects with the multicast router, wherein the configuration of privilege includes a corresponding relation between a User ID of the host and a address of multicast group in which the host wants to join;

inputting information including the User ID and a password through an interface provided by a portal server, and authenticating identification of the host with the information by the authentication server;

recording the User ID of the host and a corresponding vlan ID of the host in a multicast access privilege table by the multicast router after the authentication is successful;

wherein the step B further comprises, if the port corresponding to the destination MAC address in the IGMP Membership Report message is found in the forwarding table, forwarding to the found port, otherwise forwarding to all the ports; wherein the IGMP Membership Report message forwarded to the multicast router port carries with vlan ID of the host;

wherein the step C further comprises,

C1. after multicast router receives the IGMP Membership Report message, searching the User ID of the host in the multicast access privilege table based on the vlan ID in the IGMP Membership Report message; then sending an extended RADIUS authentication message which includes the User ID just found as the user name and the address of multicast group in which the host wants to join as the attribute, to the authentication server; detecting whether to accept the host joining in the multicast group by the authentication server according to the configuration of privilege;

if the host has suitable privilege, responding with an acceptance message to the multicast router by the authentication server, and then executing step C2, otherwise returning a reject message; the multicast router does nothing and ends after receiving the reject message;

C2. after the multicast router receives the acceptance message, writing the address of the multicast group in which the host can join into the said multicast access privilege table, and implementing a routine disposal on join messages of the host, then generating a Join message, which comprises the vlan ID corresponding to the port that links with the host which wants to join in the multicast group, the address of the multicast group that is applied for, and a Join command field, and then transmitting to the Ethernet switch; moreover, completing a routine processing of creating multicast forwarding tree on the IGMP Membership Report message;

C3. searching the MAC address corresponding to the address of the multicast group in the forwarding table by the Ethernet switch; if the entry corresponding with the MAC address is found, obtaining the port number of the host via the vlan ID in the Join message, and then adding the port number into the said entry; if nothing is found, adding an entry in the forwarding table, which comprises the MAC address corresponding to the multicast address, the port number of the host which applies to join in the multicast group, and the port number of the multicast router connected with the Ethernet switch;

C4. sending only one copy of the multicast flow to the Ethernet switch by the multicast router.

7. The method for implementing a controlled multicast according to claim 6, for the host which wants to leave the multicast group, the method further comprising:

forwarding an IGMP Leave message from the host by the Ethernet switch; and generating a Leave message to control deleting the entry of the host in the forwarding table after the multicast router receives the IGMP Leave message.

8. The method for implementing a controlled multicast according to claim 6, further comprising:

actively generating the Leave message to control deleting the entry of the host in the forwarding table by the multicast router once knowing offline status of the host; and terminating the multicast flow transmission.

9. The method for implementing a controlled multicast according to claim 7, wherein:

the step of forwarding an IGMP Leave message from the host further comprises forwarding the IGMP Leave message from the host based on the current forwarding table;

the IGMP Leave message forwarded to the multicast router carries with the vlan ID of the host;

the step of generating a Leave message to control deleting the entry of the host in the forwarding table further comprises:

after the multicast router receives the IGMP Leave message, extracting the vlan ID from the message, and obtaining corresponding entry via searching in the multicast access privilege table with the vlan ID, then deleting the address of the multicast group indicated by the IGMP Leave message in the entry of the multicast access privilege table;

completing a routine disposal on leave messages of the host, and then generating a Leave message and sending to the Ethernet switch, which includes the vlan ID of the host which wants to leave group, the address of multicast group where the host wants to leave and a Leave command field; and after the Ethernet switch receives the Leave message, obtaining the entry through looking up the forwarding table with the MAC address corresponding to the multicast address of the multicast group, and getting the port number of the host with the vlan ID in the Leave message, and then deleting the said port number from the said entry.

10. The method for implementing a controlled multicast according to claim 9, the step of generating a Leave message to control deleting the entry of the host in the forwarding table further comprises: if the deleted port is the solely port of the said entry in the forwarding table, further deleting the whole entry.

11. The method for implementing a controlled multicast according to claim 6, further comprising:

during the messages forwarding, adopting a vlan protocol between the multicast router port and the Ethernet switch.

12. The method for implementing a controlled multicast according to claim 6, the method further comprises:

filtering data messages send by a multicast sender with a multicast Access Control List (ACL) through the first receiver among the multicast routers: and forwarding the data messages that satisfy the requirements in the ACL to the multicast tree.

13. The method for implementing a controlled multicast according to claim 12, wherein the multicast ACL comprises a command word, a source address and a group address.

14. The method for implementing a controlled multicast according to claim 12, wherein:

the multicast ACL is distributed to each multicast router by a centralized multicast service control server; and the multicast service control server acts as the authentication server.

15. The method for implementing a controlled multicast according to claim 12, wherein the multicast ACL can also be distributed by a centralized policy server or a network manager.

* * * * *

UNITED STATES PATENT AND TRADEMARK OFFICE
CERTIFICATE OF CORRECTION

PATENT NO. : 7,680,884 B2  Page 1 of 1
APPLICATION NO. : 10/502543
DATED : March 16, 2010
INVENTOR(S) : Zhou et al.

It is certified that error appears in the above-identified patent and that said Letters Patent is hereby corrected as shown below:

In Claim 1,  Column 11, line 6, delete "sewer" insert -- server --
Column 11, line 11, delete "sewer" insert -- server --
Column 11, line 15, delete "sewer" insert -- server --
Column 11, line 29, delete "sewer" insert -- server --
Column 11, line 59, after switch insert -- ; --

Signed and Sealed this

Twenty-fifth Day of May, 2010

David J. Kappos
*Director of the United States Patent and Trademark Office*